Figure 1A:
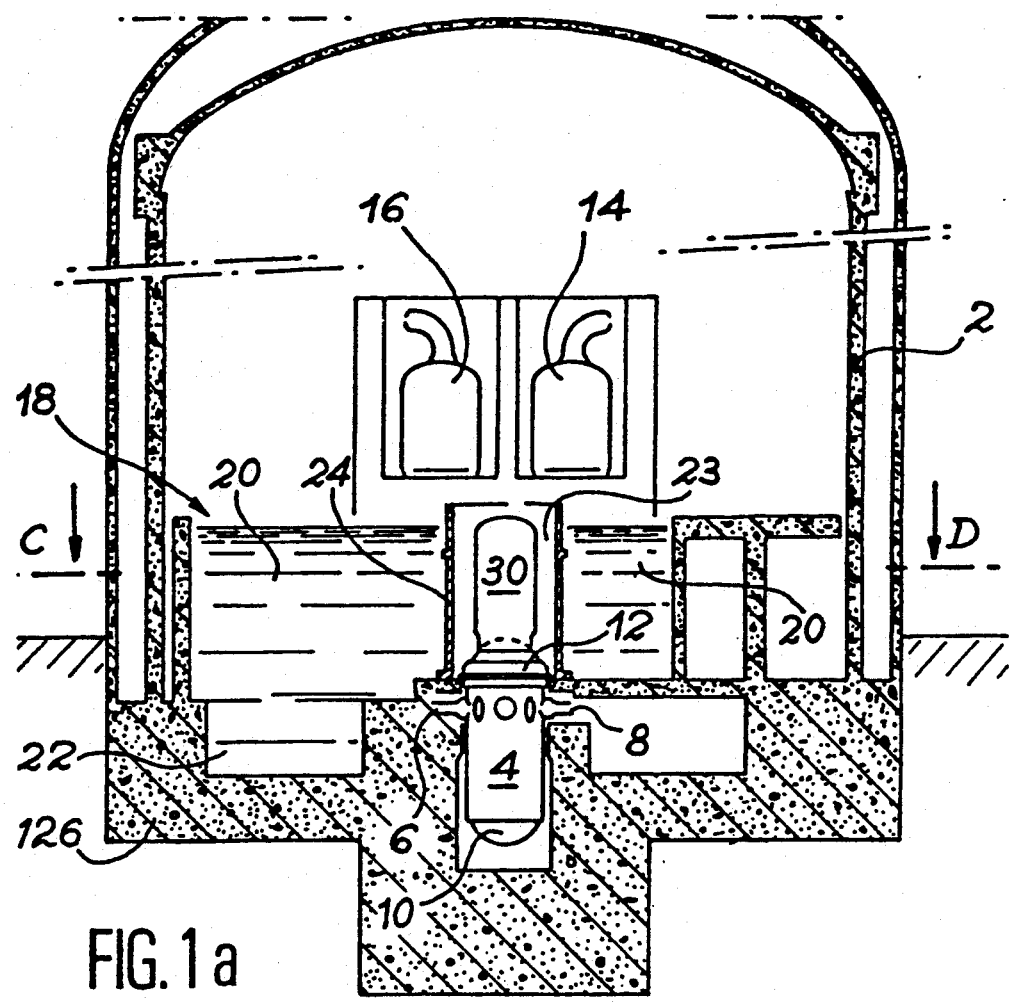

United States Patent [19]

Costes

[11] Patent Number: 5,075,070
[45] Date of Patent: Dec. 24, 1991

[54] HANDLING POOL AND SAFETY WATER RESERVE FOR PRESSURIZED WATER-COOLED NUCLEAR REACTOR

[75] Inventor: Didier Costes, Paris, France

[73] Assignee: Commissariat a L'Energie Atomique, Paris, France

[21] Appl. No.: 488,249

[22] Filed: Mar. 5, 1990

[30] Foreign Application Priority Data

Mar. 7, 1989 [FR] France ............................ 89 02967

[51] Int. Cl.$^5$ .......................................... G21C 13/00
[52] U.S. Cl. ..................................... 376/293; 376/287
[58] Field of Search ............... 376/293, 287, 282, 292, 376/263, 262, 205, 203, 272, 260, 261; 250/515.1, 517.1, 518.1

[56] References Cited

U.S. PATENT DOCUMENTS

| | | | |
|---|---|---|---|
| 3,752,738 | 8/1973 | Naymark | 376/293 |
| 3,775,246 | 11/1973 | Frisch et al. | 376/263 |
| 3,865,688 | 2/1975 | Kleimola | 376/293 |
| 3,984,282 | 10/1976 | Kleimola | 376/293 |
| 4,050,983 | 9/1977 | Kleimola | 376/293 |
| 4,213,824 | 7/1980 | Jabsen | 376/293 |
| 4,753,771 | 6/1988 | Conway et al. | 376/293 |

FOREIGN PATENT DOCUMENTS

| | | |
|---|---|---|
| 2315289 | 10/1974 | Fed. Rep. of Germany. |
| 2210802 | 7/1974 | France. |
| 2300400 | 9/1976 | France. |
| 2431752 | 2/1980 | France. |

Primary Examiner—Daniel D. Wasil
Attorney, Agent, or Firm—Kerkam, Stowell, Kondracki & Clarke

[57] ABSTRACT

Handling pool for nuclear fuel, located above the vessel of a pressurized water-nuclear reactor, characterized in that it has, around the vessel cover and the mechanisms surmounting it, a bulkhead, which is generally cylindrical of revolution and is tightly and detachably fixed to the pool bottom. This arrangement makes it possible to keep the pool filled with water outside the bulkhead during reactor operation, so that within the safety enclosure there is a large water reserve on the core, which facilitates its reflooding if there is a fracture to the primary circuit. The still full pool can be used for storing spent fuel.

6 Claims, 3 Drawing Sheets

HANDLING POOL AND SAFETY WATER RESERVE FOR PRESSURIZED WATER-COOLED NUCLEAR REACTOR

The invention relates to pressurized water nuclear reactors having a vessel containing the nuclear core and provided with a cover, which is opened for replacing the fuel elements of the core. The vessel and the remainder of the pressurized primary circuit where the core boron-containing cooling water circulates are contained in a safety enclosure.

In order to compensate the temperature and volume variations of the primary boron-containing water, to allow above the vessel the filling of a discharge pool or pond ensuring the necessary protection during the fuel replacement operations and to provide a cooling water reserve supply for use in the case of an accident on the primary circuit, a boron-containing water reservoir is generally provided which, in existing installations, in normally placed outside the enclosure. Thus, this location suffers from the disadvantage of requiring a pumping system for the distribution of the emergency cooling water.

Of late various arrangements have been considered for modifying either the location, or the operation of this reservoir. For example, its positioning within the enclosure and to make it serve for the storage of spent fuel have been proposed, cf. French patent 78 21 492 in the name of the Applicant.

In addition, "The Westinghouse AP 600 passive safety systems—A key to a safer, simplified PWR" by L.E. CONWAY, ANS Conference, Seattle, May 1988, proposes placing it in the enclosure above the nuclear core in order to permit a hydrostatic reflooding thereof in the case of an accident, when its pressure has sufficiently decreased. It is not stated that this reservoir is used for fuel storage. There is a transfer of water between the reservoir and the discharge pool, which is filled above the vessel for fuel replacement operations.

It is also known that discharge pools normally have bulkhead walls, which can be inserted in vertical slides and can subdivide a generally elongated pool into three compartments, that in the centre being located above the vessel and must be free from water when the vessel cover is present. It is not possible to operate the reactor with the said compartment empty and the other two compartments full of water, because the sealing of the bulkheads is based on inflated flexible joints and cannot be ensured on a long term basis, whereas the upper face of the vessel cover and the inspection and instrumentation means fixed above it must always remain dry. In the state of the art, the fuel handling pools positioned above the reactor are consequently completely emptied for the operation thereof and cannot be used as a cooling water reservoir in hydrostatic charge on the core.

The present invention relates to a handling pool for a nuclear reactor permitting the operation of the reactor with an empty pool compartment above the vessel, the remainder of the pool remaining full of water and ensuring the necessary water reserve supply in the case of an accident, which leads to economies as regards the overall dimensions and to the advantages described hereinafter.

This handling pool for a pressurized water-cooled nuclear reactor, of the type located above the level of the reactor core, is characterized in that it has, in the area above the core cover, a detachable bulkhead, which is approximately cylindrical of revolution, which has an internal diameter permitting the free passage of the vessel cover, which is provided at its base with members enabling it to tightly bear on the bottom of the pool around the vessel, together with water filling and emptying means.

Thus, said bulkhead keeps dry the vessel cover and the mechanism surmounting the same. When the cover has been removed, it can be filled with water and removed, the operations being reversed for the refitting of the cover.

More specifically, the means allowing the tight bearing of the bulkhead on the bottom of the pool comprise a horizontal circular flange, with a standard sealing means, more particularly in the form of a double joint with leak suction between the joints, which eliminates any risk of water leaking from the pool to the cover, unlike in the case of the seals used in the prior art for bulkheads constituted by planar walls. This flange is fastened to the bottom of the pool by detachable connectors, such as manipulatable screws, from the top of the bulkhead.

In connection with pressurized water reactors, the precautions taken for the vessel and the cover fixing means are considered to be adequate to make it unnecessary to have to avoid the consequences of the vessel fracturing. If account is to be taken of extremely pessimistic hypotheses, it is possible to install on the one hand a vessel shaft able to confine a vessel explosion and on the other hand means preventing the flying off of the cover. Numerous proposals have been made in this sense. The reactor with a water reserve above the core deals with a particular safety concern and every effort has been made to make the fly off preventing means compatible with the presence of the cylindrical bulkhead according to the invention.

According to another feature of the invention, the bulkhead receives a first detachable downward locking means with respect to the vessel cover and a second upward detachable locking means with respect to the civil engineering structures of the nuclear reactor and more particularly pool walls, so that the cover is prevented from flying off.

According to another feature of the invention, these detachable locking means are constituted by oblique members, each having an extension spring and a hydraulic shock absorber only allowing a slow shortening when a compression force is applied. Thus, the forces imposed in normal service as a result of the various expansions which occur remain low and in particular do not detach the bulkhead joint. Moreover, in the case of the anchoring pins or dowels of the cover breaking, there are no mechanical shocks during the taking up of the force by the pool walls and the primary circuit discharge takes place in a relatively controlled manner.

The mass of water available in the reactor closure, on the one hand in the pool and usable as a result of the invention, and on the other hand in possible supplementary reservoirs, can be such that, following a serious fracture to the primary circuit, the flooding of all the caves containing the circuit is ensured, which provides the necessary certainty that the nuclear core is reflooded. A residual water quantity in the pool can also be ensured, which makes it possible to use a deep location in the pool for storing spent fuel. The bulkhead according to the invention permits a particularly economic and reliable storage of the spent fuel within the framework of reactors having "intrinsic safety".

Figure 1B:
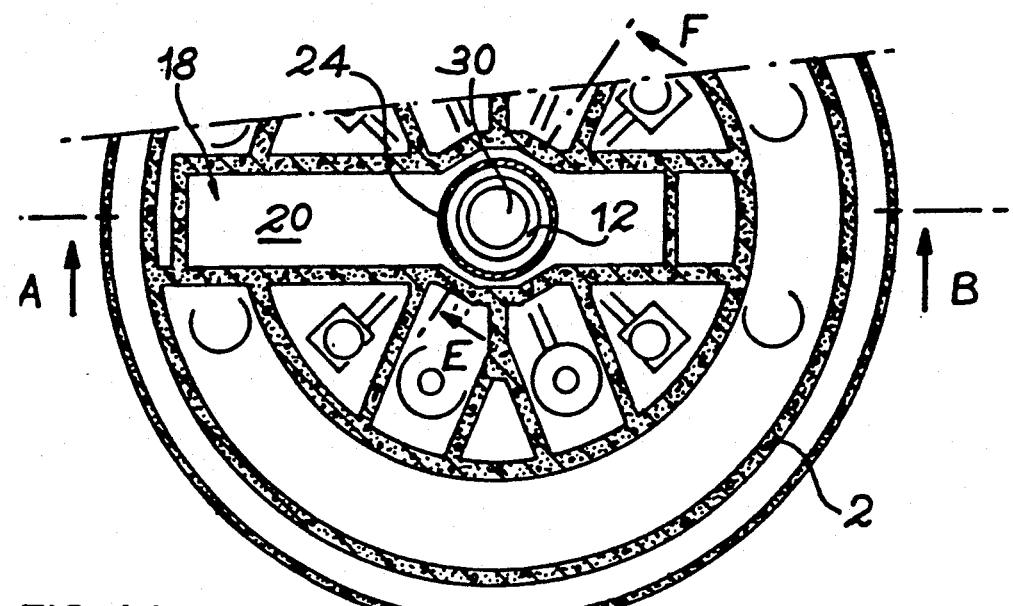

The invention is described in greater detail hereinafter relative to an embodiment of the water reserve and handling pool for a pressurized water nuclear reactor relative to the attached drawings, wherein show:

FIG. 1a: an elevation along the vertical plane A-B of FIG. 1b of a nuclear power station in its concrete enclosure with the core and pool according to the invention.

FIG. 1b: a plan view of a horizontal section along C-D of the installation of FIG. 1a.

Figure 2:
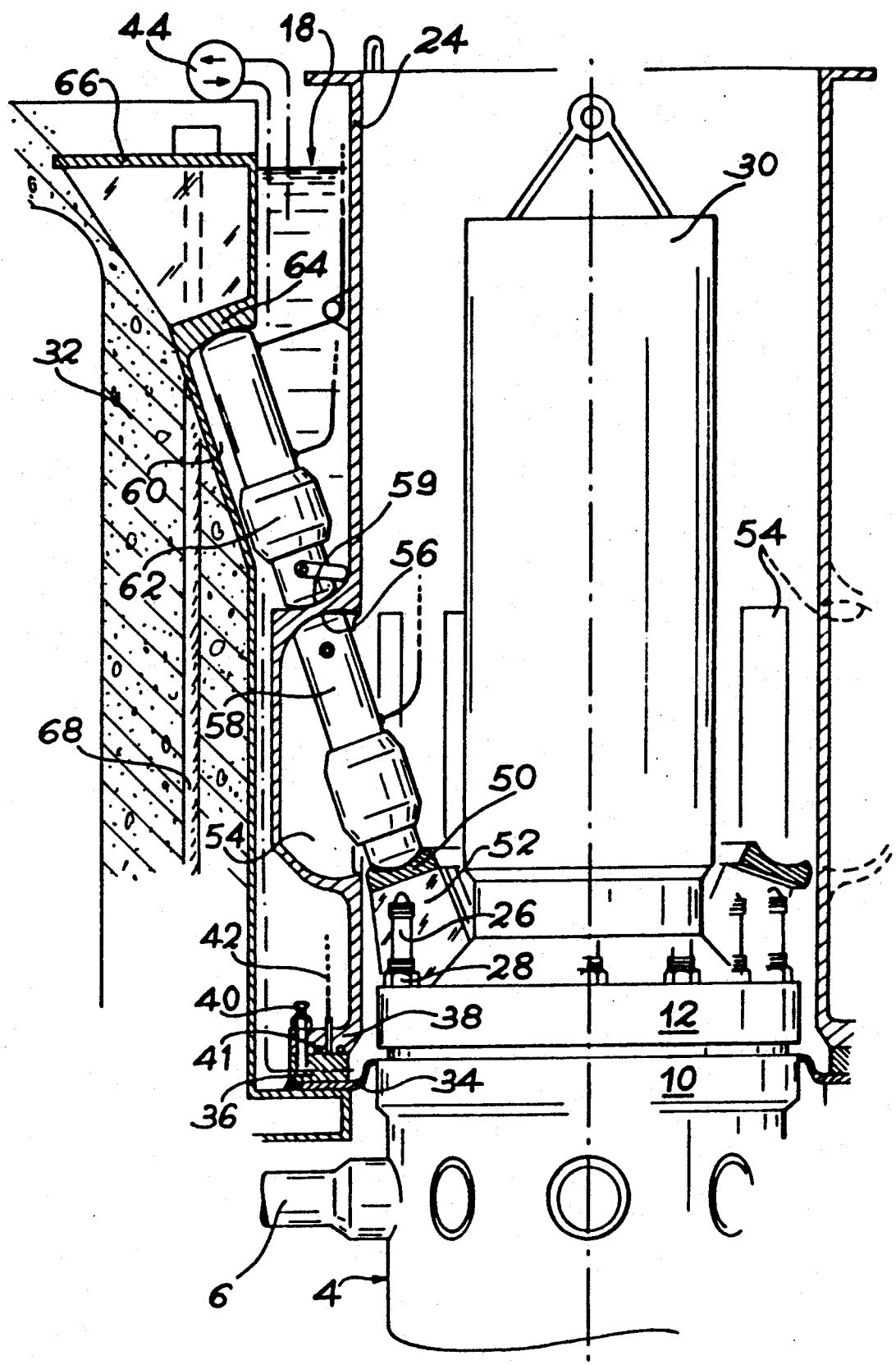

FIG. 2: on a larger scale, the technological details of installing a bulkhead according to the invention, FIG. 2 being a vertical section in elevation along line E-F of FIG. 1b.

Figure 3:
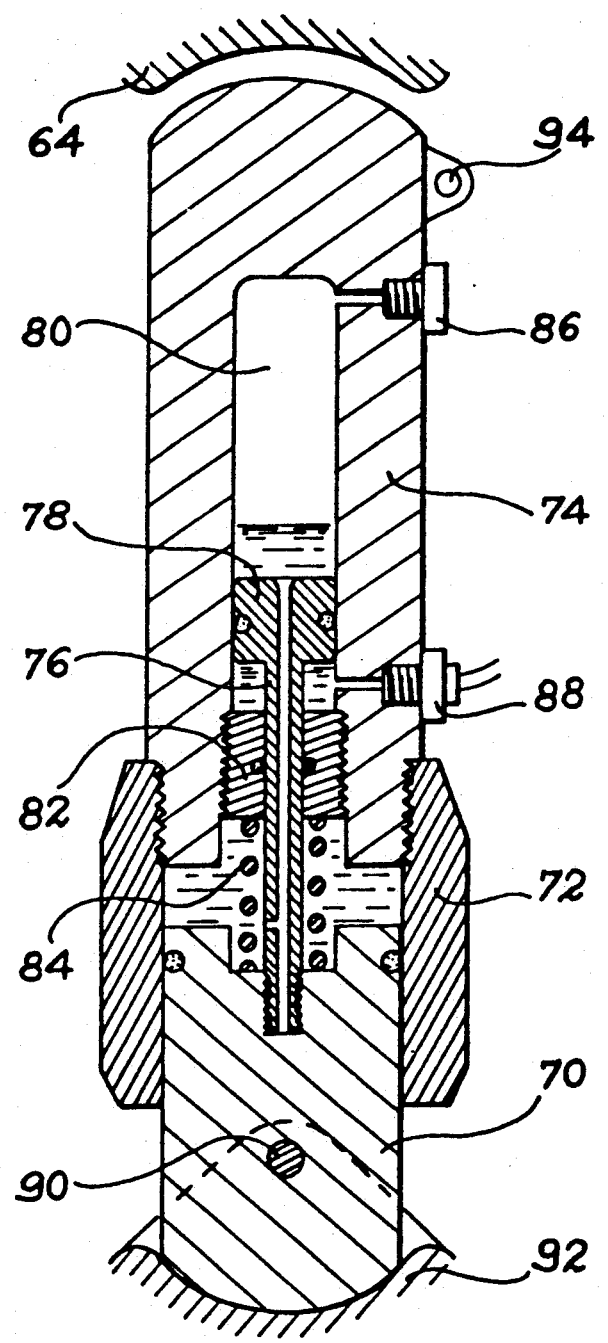

FIG. 3: a sectional view of a detachable locking member.

FIG. 1a shows in section the known standard components of a pressurized water-cooled nuclear power station. In a concrete enclosure 2 is located the actual reactor 4 with its primary water intakes and outlets 6, 8, as well as the vessel 10 provided with its cover 12. It is also possible to see the pool 20 and the steam generators 14, 16 above nuclear reactor 4. FIG. 1b, carrying the same reference numerals reveals the general elongated shape of pool 18.

As in the prior art, above vessel 10 is located a pool 20 used for the handling of the nuclear fuel, the water ensuring the biological protection of operators and the cooling of the fuel elements removed from nuclear core, which continue to give off a significant heat flux. As a result of the invention, said pool can be kept filled with water when the reactor is operating. It is used here as a water reserve supply to be used in the case of a fracture of the primary circuit and when there is a risk of the core dyring out. At the maximum depth region of pool 20, the concrete mass 126 has located therein a compartment 22 is used for the medium term storage of spent fuel elements, e.g. for two years, the radioactive and heat flux of said elements then having sufficiently decreased to permit their removal by relatively simple means. The bulkhead 24 according to the invention makes it possible to keep dry the reactor cover 12 and the upper mechanisms indicated by volume 30. For opening the cover, the water pressure in the primary circuit is firstly reduced in order to obtain atmospheric pressure at the cover joint and then the fixing pins are removed. As the cover is raised until it passes out of the bulkhead shaft, the latter is supplied with water, either coming from the primary circuit, or through a direct supply of pool water to the bulkhead. When the cover has been removed to a storage area and once the levels have been evened out, it is possible to detach the bulkhead from the bottom of the pool and remove it to another storage area, which enables the reactor discharge operations to take place. The operations are reversed for the reclosure of the cover.

On referring to FIG. 2, a more detailed description will be given of the essential means of the invention constituted by the bulkhead 24 surrounding in circular manner the upper part of the cover 12 and provided with sealing means in order to permit, without emptying pool 20, the maintaining dry of the area located above reactor 4.

FIG. 2 partly shows the section 32 of the walls of pool 18 surrounding the upper part of reactor 4. The reactor vessel 4 has a flange 10 for fixing the cover 12 by means of pins 26, which are extended above the locking nut 28 in order to facilitate their tensioning. Flange 10 is connected to the pool bottom at the periphery by a prior art metal bellows 34, so that the water does not penetrate round the vessel. In this case the bellows leads to a machined metal bearing 36 welded to the pool bottom around the vessel and permitting the bearing of the bulkhead 24, via its flange 38, fixed on the bearing by screws 40 and carrying two gaskets 41 and a leak suction device 42. This connection ensures an excellent reliability and it is possible to be completely sure that the pool water will not reach the vessel cover as a result of leak in said connection. The bulkhead 24 can be used in the manner described hereinbefore for operations on the fuel. A pumping means 44 making it possible to regulate the water height within the bulkhead is diagrammatically shown.

A description will now be given of the optional improvement of the invention aiming at preventing the flying off of the cover in the hypothesis of a fracture in the series of pins 26. The flying off force can be evaluated as the product of the cover opening surface, i.e. approximately 18 m$^2$ for a 1300 MWe reactor, by the saturated steam pressure of the primary water, i.e., 12.5 MPa for 328° C. above the core, i.e. 175 MN (or approximately 17,500 tonnes). The locking elements are interposed between the upper face of the cover and the two long walls of the pool. During the normal operation of the reactor, they must not impede the free expansion of bulkhead 24.

According to the invention, above the cover is used a distribution ring 50 bearing on the surface of the cover by means of a welded assembly of radial layers 52 interposed betwen the overlengths of pins 26 and their nuts, but without touching them. Between the ring 50 and the parts 54 in the bulkhead wall and forming bearing steps 56, is provided a first group of oblique members 58, which are normally under slight compression under the influence of a spring, but able to withstand a brutal compression, as will be described hereinafter. Between the bulkhead 24 and recesses 60 in the pool walls 32 is provided a second group of members 62, which are identical to members 58 and which bear on steps 59 of the bulkhead above recesses 54 and which form projections on the outer surface of the bulkhead.

The recesses 60 in the pool walls have metal bearing areas 64 for the members 62 and which are connected by mechanically welded structures to distribution plates 66 for prestressed fitting such as 68, which are anchored deep in the floor of the building.

With reference to FIG. 3, a description will now be given of a type of member suitable for the second group and which ensures the locking between the bulkhead and the walls. If e.g. use is made of 12 members in each group, the force involved reaches approximately 15 MN, whilst the clearance to be provided for expansions, tolerances and the necessary shrinkage on fitting is approximately 40 mm. The member has a lower piston 70 sliding in a cylinder 72 integral with an upper rod 74. Piston 70 is connected by a tube 76 to a small piston 78 sliding in a recess 80 of rod 74, tube 76 sliding in a ring 82 integral with the latter. A spring 84 maintains a spacing between piston 70 and rod 74. The connection thread between tube 76 and piston 70 is not tight and allows a liquid enclosed between piston 70 and rod 74 to escape at a limited flow rate towards the upper part of the recess 80, which is provided with a normally closed purge 86. The annular space between the small piston 78 and the ring 82 can receive, by the detachable flexible part 88, an injection of liquid making it possible to retract the member by compressing spring 84, in order to allow the putting into place or removal of the member. The member is loosely held at the bottom by an articulation 90 positioning it in front of its bearing face 92, whilst an upper control 94 positions it in front of its bearing face 64. Thus, such a member is vertically retracted against the bulkhead 24 for the handling of the latter and is obliquely extended for the operation of the reactor.

The members of the first group can be identical and for handling purposes they can remain joined either to ring 50, or to bulkhead 24.

Their slack articulation like 90 is then positioned at the top, as indicated in FIG. 2.

When such a member is brutally compressed, the liquid interposed between piston 70 and rod 74 only escapes at a low flow rate into the recess 80, where it compresses air and consequently the compression shock is transmitted without clearance to prestressed fittings joined to the building.

All the elements of this resistance chain from the cover to the building can be dimensioned so as to resist the necessary forces. It is pointed out that in reactors having "intrinsic safety" of the type involved here, the primary circuit is located in relatively small caves, which can be very robust and can withstand the forces towards the walls in the case of a vessel explosion. The fly off preventing device then evens out safety.

In order to open the vessel after the operation of the reactor, it is necessary to:

retract the members of the first group and bring them vertically into the recesses 54 (optionally removing them separately), extract ring 50 and the distribution layers, possibly in several segments, unscrew the vessel pins and extract the vessel cover (after carrying) out the usual disconnections), if appropriate, allow the water to rise in the bulkhead as the cover is extracted, complete the evening out of the water levels between the bulkhead and the pool, retract the members of the second group and bring them vertically against the bulkhead wall, unscrew screws 40 and extract the bulkhead.

The operations are obviously reversed for reclosing the vessel.

Thus, in summarizing, the pool according to the invention offers the following advantages. It makes it possible to locate the boron-containing water reserve supply within the enclosure and above the vessel, which improves protection in the case of a primary circuit fracture, with minimum costs and minimum complications, because use is made of the discharge pool. It permits the storage of spent fuel in the pool within the enclosure for e.g. 1 to 2 years, which then permits it transports in relatively simple containers to a centralized storage location for several reactors. The risks associated with the storage outside the enclosure of highly active spent elements are eliminated and the economic aspects improve. The cylindrical bulkhead can be used as a locking structure in the case of the vessel cover flying off, which leads to additional safety, although this accident is highly unlikely to happen.

I claim:

1. A pressurized water-cooled nuclear reactor comprising:

a pressure vessel containing a nuclear core and a removable upper part disposed above said nuclear core, the upper part of said vessel comprising a vessel cover and a plurality of attached upper mechanisms which are to be maintained in a dry condition, and a pool, said pool comprising an approximately cylindrical, removable, leaktight, open bulkhead disposed directly above said nuclear core and around said upper part of said pressure vessel, a wall top level of said bulkhead being higher than a predetermined pool water upper level, the bulkhead further being provided at its base with means permitting a tightbearing of the bulkhead at a bottom of the pool around said vessel cover, said bulkhead defining in said pool a dry space containing said upper part, the diameter of said bulkhead permitting lift-off or lowering of said upper part, said bulkhead being provided with means for filling with water or emptying said internal dry sapce during lift-off or lowering of said upper part.

2. A pressurized water-cooled nuclear reactor as recited in claim 1 wherein the bulkhead (24) has on the bottom of the pool a circular, horizontal bearing flange (38) provided with two gaskets or packings (41) in series and a leak suction device, said flange being fixed to a planar bearing (36) by screws (40).

3. A pressurized water-cooled nuclear reactor as recited in claim 1 or 2 wherein the bulkhead (24) comprises first detachable, vertical locking means (58) between the vessel cover (12) and its lower part and second detachable, vertical locking means (62) between its upper part and the fixed structures of the pool.

4. A pressurized water-cooled nuclear reactor as recited in claim 3 wherein the first locking means comprises detachable oblique members (58) provided with a hydraulic shock absorber, an extension spring and a jack, cooperating with a distribution ring (50) placed on the vessel cover and with bearing steps (56) in the bulkhead wall.

5. A pressurized water-cooled nuclear reactor as recited in claim 4 wherein the second locking means comprises detachable oblique members (62) provided with a hydraulic shock absorber, an extension spring and a jack, which cooperate with bearing steps (59) on an outer wall of the bulkhead and with steps (64) in the pool wall (32).

6. A pressurized water- cooled nuclear reactor as recited in claim 1 wherein said pool also comprises, located in the concrete mass (126) constituting the bottom of the enclosure and beneath the level of the reactor vessel cover (12), a compartment (22) reserved for the storage of spent fuel.

* * * * *